(12) United States Patent
Lee et al.

(10) Patent No.: US 12,079,416 B2
(45) Date of Patent: Sep. 3, 2024

(54) DISPLAY DEVICE AND ELECTRONIC DEVICE

(71) Applicant: Samsung Display Co., Ltd., Yongin-Si (KR)

(72) Inventors: Hyun Jae Lee, Yongin-si (KR); Sung Hwan Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/132,850

(22) Filed: Apr. 10, 2023

(65) Prior Publication Data

US 2023/0400942 A1 Dec. 14, 2023

(30) Foreign Application Priority Data

Jun. 14, 2022 (KR) .......................... 10-2022-0072424

(51) Int. Cl.
*G06F 3/041* (2006.01)
*G06F 3/044* (2006.01)
*H04B 7/06* (2006.01)
*H04B 7/08* (2006.01)

(52) U.S. Cl.
CPC ......... *G06F 3/0416* (2013.01); *H04B 7/0602* (2013.01); *H04B 7/0834* (2013.01); *G06F 3/04184* (2019.05); *G06F 3/0445* (2019.05)

(58) Field of Classification Search
None
See application file for complete search history.

(56) References Cited

U.S. PATENT DOCUMENTS

| 9,748,667 | B2 * | 8/2017 | Nakamura | ............. H01Q 21/28 |
| 10,990,234 | B2 | 4/2021 | Kim et al. | |
| 11,805,199 | B2 * | 10/2023 | Sung | .......................... G06F 1/26 |
| 2012/0071203 | A1 * | 3/2012 | Wong | .................... H04M 1/724 |
| | | | | 455/550.1 |
| 2012/0313901 | A1 * | 12/2012 | Monson | ............... H01Q 1/2216 |
| | | | | 345/178 |
| 2013/0093680 | A1 * | 4/2013 | Ogita | .................... G06F 1/1626 |
| | | | | 345/174 |

(Continued)

FOREIGN PATENT DOCUMENTS

| KR | 10-2009382 B1 | 8/2019 |
| KR | 10-2020-0073478 A | 6/2020 |

(Continued)

OTHER PUBLICATIONS

RF Wireless World, Handoff/Handover, downloaded from https://web.archive.org/web/20190201165516/https://www.rfwireless-world.com/Terminology/handoff.html (2019 copy). (Year: 2019).*

*Primary Examiner* — Dorothy Harris
(74) *Attorney, Agent, or Firm* — Innovation Counsel LLP

(57) ABSTRACT

A display device includes: a display panel; a sensor substrate disposed on the display panel, the sensor substrate including a touch sensing area; sensing electrodes and antenna sets, disposed on the touch sensing area of the sensor substrate; and an input sensing circuit for sensing an external input based on sensing signals from the sensing electrodes. The input sensing circuit determines whether the external input occurred on an area in which the antenna sets are disposed in the touch sensing area, based on the sensing signals.

20 Claims, 14 Drawing Sheets

(56) References Cited

U.S. PATENT DOCUMENTS

| | | | |
|---|---|---|---|
| 2013/0169507 A1* | 7/2013 | Ko | H01Q 1/243 |
| | | | 343/876 |
| 2013/0328723 A1* | 12/2013 | Rappaport | H01Q 3/24 |
| | | | 342/372 |
| 2014/0045424 A1* | 2/2014 | Fratti | H01Q 1/44 |
| | | | 343/866 |
| 2015/0268742 A1* | 9/2015 | Park | G06F 3/04162 |
| | | | 345/179 |
| 2017/0123531 A1* | 5/2017 | Saul | H01Q 1/48 |
| 2017/0179996 A1* | 6/2017 | Knepper | G06F 3/0416 |
| 2018/0314369 A1* | 11/2018 | Yashiro | H01Q 1/243 |
| 2019/0361549 A1* | 11/2019 | Gu | H01Q 1/24 |
| 2020/0393932 A1* | 12/2020 | Kida | G06F 3/04164 |
| 2021/0005960 A1* | 1/2021 | Kida | H01Q 7/00 |
| 2021/0091816 A1 | 3/2021 | Noh et al. | |
| 2022/0137741 A1 | 5/2022 | Choi et al. | |
| 2022/0399406 A1* | 12/2022 | Bok | G06F 3/0443 |

FOREIGN PATENT DOCUMENTS

| | | |
|---|---|---|
| KR | 10-2021-0034994 A | 3/2021 |
| KR | 10-2233676 B1 | 3/2021 |
| KR | 10-2347921 B1 | 1/2022 |
| WO | 2020122674 A1 | 6/2020 |

\* cited by examiner

DP (DP-DA)

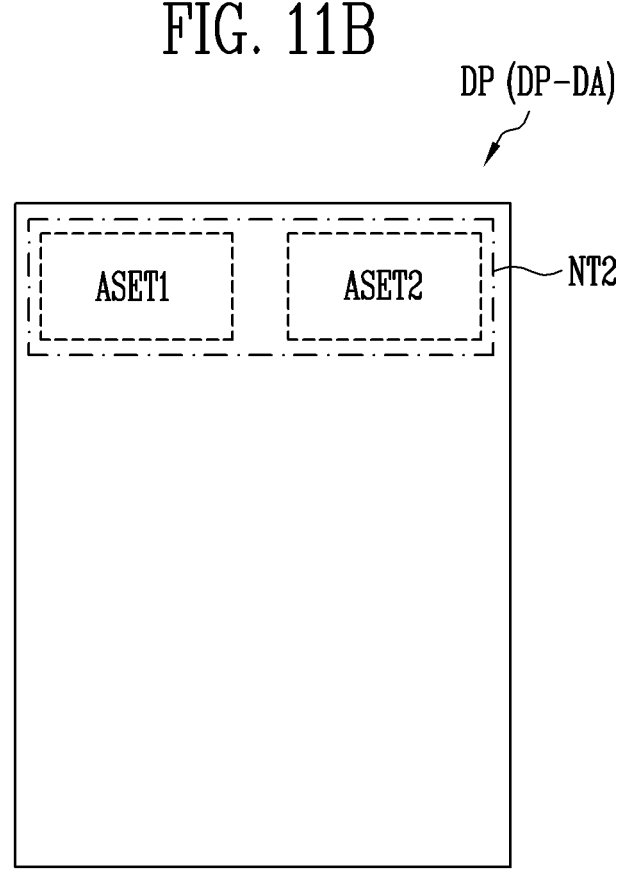

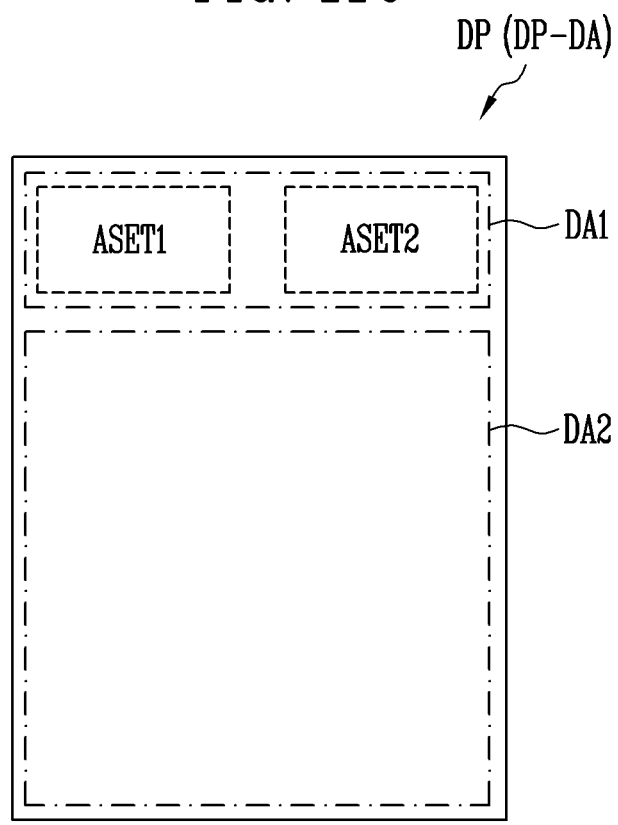

DISPLAY DEVICE AND ELECTRONIC DEVICE

CROSS-REFERENCE TO RELATED APPLICATION

The present application claims priority under 35 U.S.C. § 119(a) to Korean patent application No. 10-2022-0072424 filed on Jun. 14, 2022 in the Korean Intellectual Property Office, the entire disclosure of which is incorporated herein by reference.

BACKGROUND

1. Technical Field

The present disclosure generally relates to a display device and an electronic device.

2. Related Art

A display device often incorporates an information input function in addition to an image display function. The information input function of the display device may be generally implemented as a touch sensor for receiving a touch from a user.

The touch sensor may be attached to a surface of a display panel for implementing the image display function, or be integrally formed with the display panel. A user may input information by pressing or touching the touch sensor while viewing an image implemented on the display panel.

Meanwhile, an electronic device such as a terminal including a display device may include an antenna for short-range wireless communication and/or long-range wireless communication. When signal interference occurs between the antenna and a touch sensor, antenna performance may be deteriorated.

SUMMARY

A display device and an electronic device providing improved quality of antenna transmission/reception signals are disclosed.

In accordance with an aspect of the present disclosure, there is provided a display device including: a display panel; a sensor substrate disposed on the display panel, the sensor substrate including a touch sensing area; sensing electrodes and antenna sets, disposed on the touch sensing area of the sensor substrate; and an input sensing circuit configured to sense an external input based on sensing signals from the sensing electrodes, wherein the input sensing circuit determines whether the external input occurred in an area where the antenna sets are disposed in the touch sensing area, based on the sensing signals.

The input sensing circuit may include a memory configured to store position information of the antenna sets on the touch sensing area. The input sensing circuit may determine whether the external input occurred in an area where the antenna sets are disposed in the touch sensing area, based on the position information and the sensing signals.

In accordance with another aspect of the present disclosure, there is provided an electronic device including: a display panel; a sensor substrate disposed on the display panel, the sensor substrate including a touch sensing area; sensing electrodes and antenna sets, disposed on the touch sensing area of the sensor substrate; an input sensing circuit configured to sense an external input, based on sensing signals provided from the sensing electrodes; and an antenna module connected to the antenna sets, to perform wireless communication by using a wireless frequency signal transmitted or received to or from at least one of the antenna sets, wherein the antenna module determines whether the external input occurred in a part of the touch sensing area where the antenna sets are disposed, based on the sensing signals.

The antenna module may perform wireless communication by using a wireless frequency signal transmitted to or received from a second antenna set disposed in an area different from an area where the first antenna set is disposed, in response to sensing the external input in an area where a first antenna set used for wireless communication.

The antenna module may perform handover from the first antenna set to the second antenna set.

The antenna module may perform a wireless communication switch from first antenna set to the second antenna set in a soft handover manner.

The antenna module may perform a wireless communication switch from first antenna set to the second antenna set in a hard handover manner.

When the external input occurs on an area in which a first antenna set used for wireless communication among the antenna sets, the antenna module may suspend wireless communication of the first antenna set.

The antenna sets may include a first antenna set and a second antenna set disposed in an area different from an area in which the first antenna set is disposed. The antenna module may include: a first front end electrically connected to the first antenna set; a second front end electrically connected to the second antenna set; and a modem configured to process a signal transmitted or received through the first front end and the second front end.

The input sensing circuit may include a memory configured to store position information of the antenna sets on the touch sensing area. The input sensing circuit may determine whether the external input has occurred on the area in which the antenna sets are disposed in the touch sensing area, based on the position information and the sensing signals, and generate an antenna switching signal including determination result information.

When it is determined that the external input occurs on the area in which the first antenna set used for wireless communication among the antenna sets is disposed, based on the antenna switching signal, the antenna module may perform a wireless communication switch from the first antenna set to the second antenna set.

The electronic device may further include a processor including a memory configured to store position information of the antenna sets on the touch sensing area. The processor may receive the sensing signals from the input sensing circuit, determine whether the external input has occurred on the area in which the antenna sets are disposed in the touch sensing area, based on the position information and the sensing signals, and generate an antenna switching signal including determination result information.

The antenna module may perform a wireless communication switch from the first antenna set to the second antenna set based on the antenna switching signal and a determination that external input occurred in the area where the first antenna set is disposed.

The antenna switching signal may be a command signal.

The processor may control a notice image for notifying a user of wireless communication to display it on at least one partial area in a display area of the display panel in response to a determination that the external input occurred in the area where the antenna sets are disposed in the touch sensing area.

The at least one partial area may correspond to the area in which the antenna sets are disposed.

The processor may control a frame frequency of a first display area where the antenna sets are disposed to be different from a frame frequency of a second display area that is mutually exclusive with the first display area in a display area of the display panel, in response to a determination that the external input occurred in the touch sensing area where the antenna sets are disposed.

The processor may control the frame frequency of the first display area to be lower than the frame frequency of the second display area.

The processor may control a brightness of an image displayed in a first display area where the antenna sets are disposed to be different from a brightness of an image displayed in a second display area that is mutually exclusive from the first display area in a display area of the display panel to be different from each other.

The processor may control a brightness of an image displayed in the first display area to be lower than a brightness of an image displayed in the second display area.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 11A to 11C are diagrams illustrating examples of an operation of the electronic device shown in FIG. 10.

DETAILED DESCRIPTION

Figure 1:
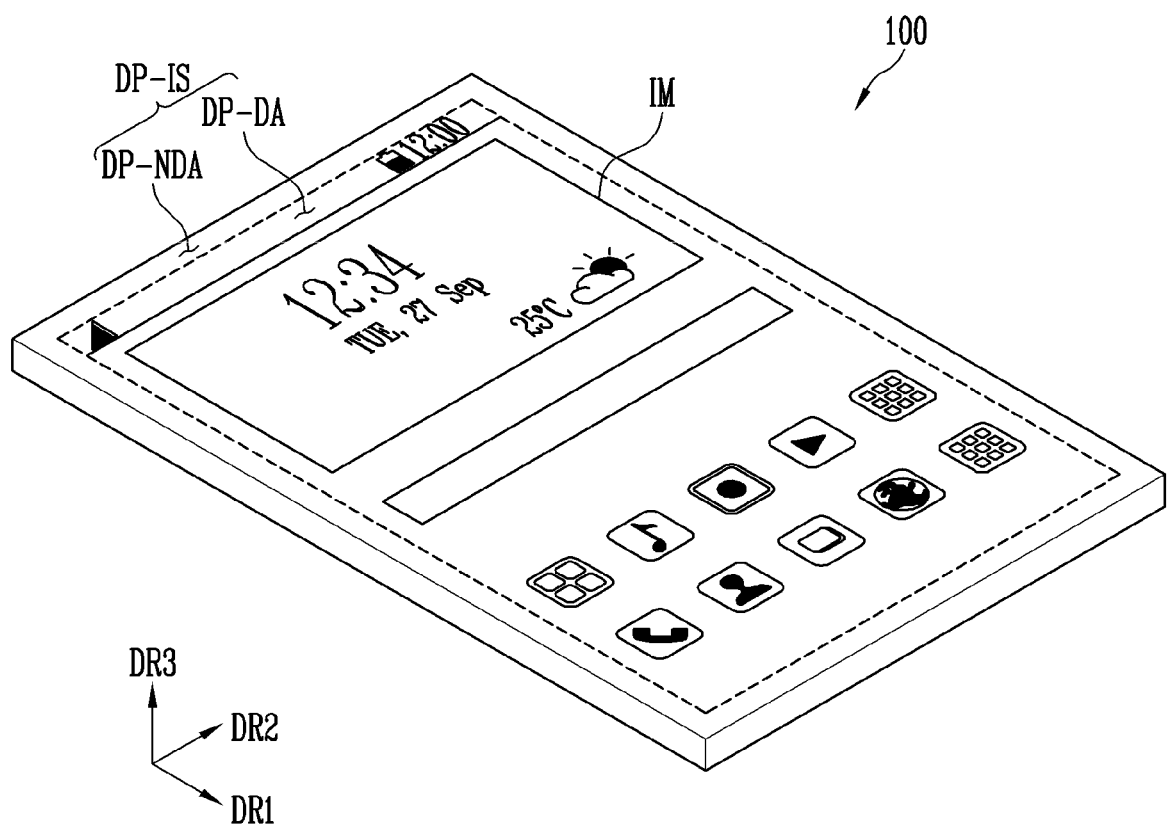
FIG. 1 is a perspective view illustrating a display device in accordance with embodiments of the present disclosure.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise. In the following description, singular forms in the present disclosure are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

In the entire specification, when an element is referred to as being "connected" or "coupled" to another element, it can be directly connected or coupled to another element or be indirectly connected or coupled to another element with one or more intervening elements interposed therebetween.

Further, an expression that an element such as a layer, region, substrate or plate is placed "on" or "above" another element indicates not only a case where the element is placed "directly on" or "just above" the other element but also a case where an additional element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, exemplary embodiments of the present disclosure will be described in more detail with reference to the accompanying drawings. Throughout the drawings, the same reference numerals are given to the same elements, and their overlapping descriptions will be omitted.

FIG. 1 is a perspective view illustrating a display device in accordance with embodiments of the present disclosure.

Referring to FIG. 1, the display device 100 may display an image IM through a display surface DP-IS. The display surface DP-IS may be parallel to a plane defined by a first direction DR1 and a second direction DR2. A normal direction of the display surface DP-IS, i.e., a thickness direction of the display device 100, may correspond to a third direction DR3.

Meanwhile, a front surface (or top surface) and a rear surface (or bottom surface) of each member, each layer or each units, described hereinbelow, are distinguished from each other by their positions along the third direction DR3. However, the first to third directions DR1, DR2, and DR3 are merely illustrative, and directions indicated by the first to third directions DR1, DR2, and DR3 are relative concepts, and may be changed into other directions.

The display device 100 may have a planar display surface. However, this is merely illustrative, and the embodiment of the present disclosure is not limited thereto. For example, the display device 100 in accordance with the embodiment of the present disclosure may have various types of display surfaces capable of displaying an image, such as a curved display surface and a stereoscopic display surface.

In an embodiment, the display device 100 may be a flexible display device. For example, the display device 100 may be implemented as a foldable display device, a bendable display device, a rollable display device, or the like.

Meanwhile, in FIG. 1, the display device 100 which may be applied to mobile terminals is exemplarily illustrated. However, this is merely illustrative, and the display device 100 may be applied not only to large electronic devices such as a television, a monitor, and an electric signboard, but also to small and medium electronic devices such as a tablet, a navigation system, a game device, and a smart watch. Also, the display device DD may also be applied to wearable electronic devices such as a head-mounted display.

As shown in FIG. 1, the display surface DP-IS of the display device 100 may include a display area DP-DA in which the image IM is displayed and a non-display area DP-NDA adjacent to the display area DP-DA. The non-display area DP-NDA may be an area in which the image IM is not displayed.

Figure 2:
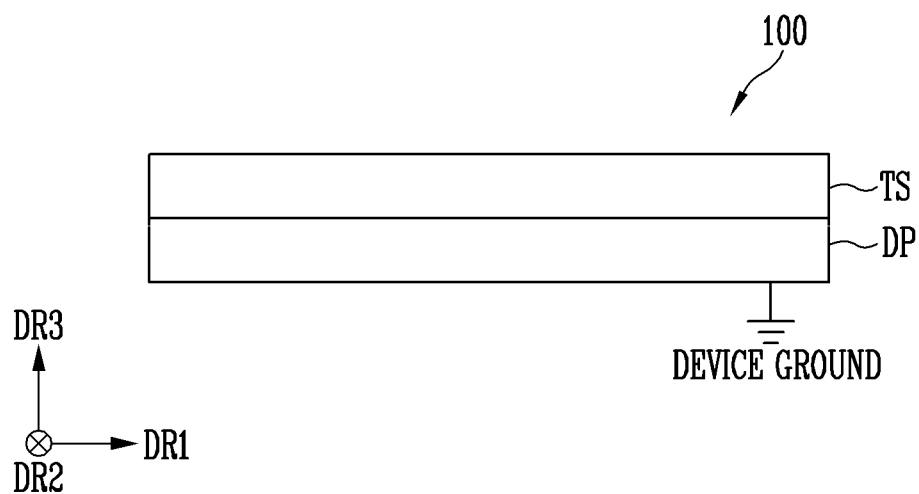
FIG. 2 is a sectional view schematically illustrating a display device in accordance with embodiments of the present disclosure.

FIG. 2 is a sectional view schematically illustrating a display device in accordance with embodiments of the present disclosure.

Referring to FIGS. 1 and 2, the display device 100 may include a display panel DP and a touch sensor TS.

The display panel DP may include a display element layer including a light emitting element LD, transistors for driving the light emitting element, and lines, and an encapsulation layer encapsulating the display element layer. The display element layer may include a display element constituting a pixel. In an embodiment, the display panel DP may include a device ground for stabilizing driving, or be connected to an external device ground.

The touch sensor TS may sense a contact or an input, which is caused by an external medium such as a hand or a pen, with respect to the display surface DP-IS of the display device 100. The touch sensor TS may be provided on the display panel DP. In an embodiment, the touch sensor TS may include sensing electrodes used for touch sensing and an antenna member used for wireless communication with the outside.

In an embodiment, the display panel DP and the touch sensor TS may be formed through a continuous process. For example, the touch sensor TS may be disposed directly on the encapsulation layer of the display panel DP.

In an embodiment, the touch sensor TS may be formed through a process separate from a process of the display panel DP, and be attached to the display panel DP. For example, the touch sensor TS may be provided in the form of a touch panel, and be attached to a top surface of the display panel DP through an optically clear adhesive member or the like.

Figure 3:
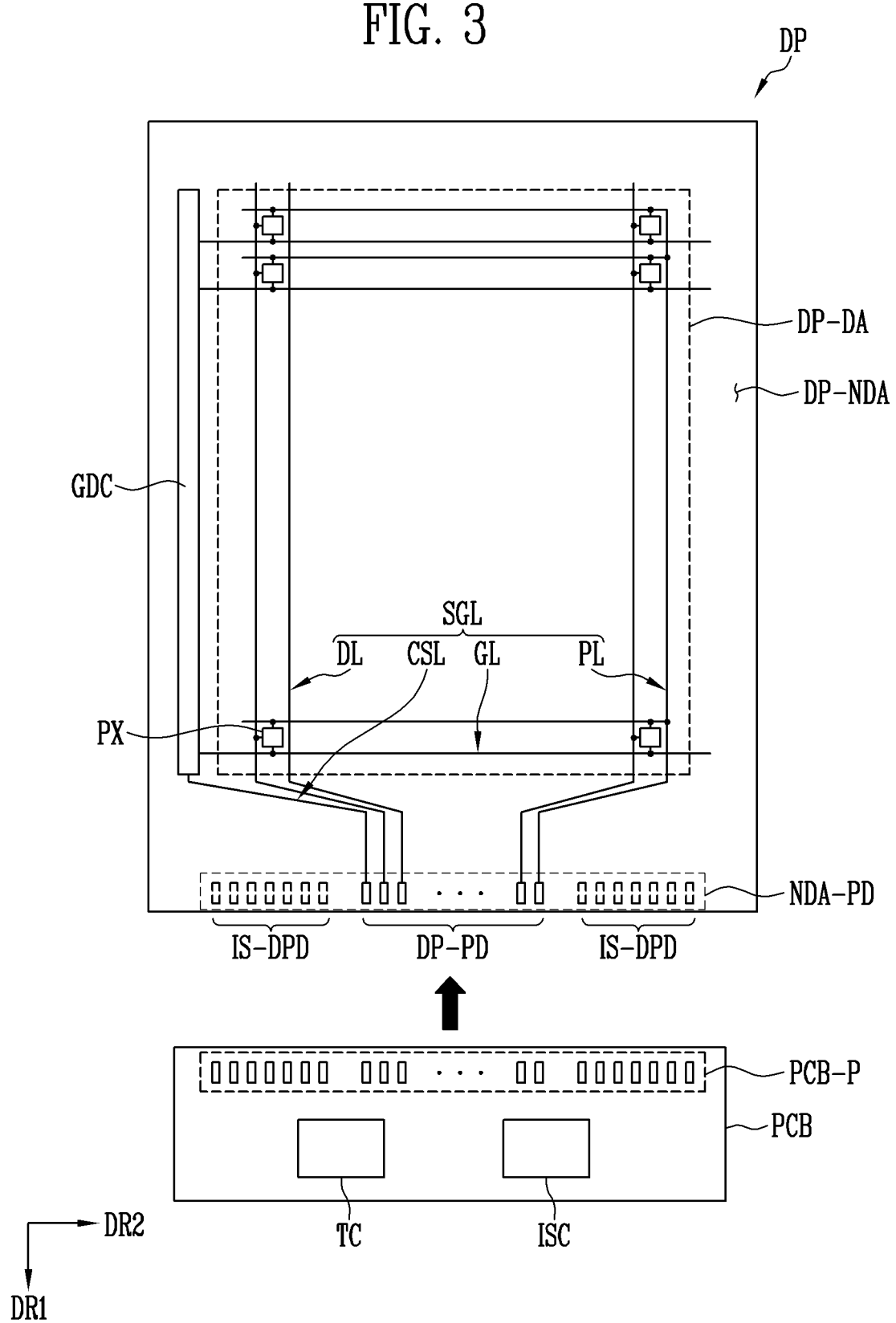
FIG. 3 is a plan view illustrating an example of a display panel included in the display device shown in FIG. 2.

FIG. 3 is a plan view illustrating an example of the display panel included in the display device shown in FIG. 2.

Referring to FIGS. 1 to 3, the display panel DP may include a display area DP-DA in which an image is displayed and a non-display area DP-NDA adjacent to the display area DP-DA. The non-display area DP-NDA may be an area in which the image is not displayed. The non-display area DP-NDA may be disposed at the outside of the display area DP-DA.

The display area DP-DA may include pixel areas in which pixels PX are provided. A pad part in which pads of lines are positioned may be provided in the non-display area DP-NDA. A data driver which provides data signals to the pixels PX may be provided in the non-display area DP-NDA. The data driver may provide data signals to the pixels PX through data lines. The data driver may be included in a timing control circuit TC which will be described later.

The display panel DP may include a driving circuit GDC, signal wirings SGL, signal pads DP-PD, and the pixels PX.

The pixels PX may be disposed in the display area DP-DA. Each of the pixels PX may include a light emitting element and a pixel driving circuit connected to the light emitting element. For example, the light emitting element may be configured as an organic light emitting diode or an inorganic light emitting diode such as a micro LED (light emitting diode) or a quantum dot light emitting diode. Also, the light emitting element may be a light emitting element configured with a combination of an organic material and an inorganic material. Further, each of the pixels PX may include a single light emitting element. In another embodiment, each of the pixels PX may include a plurality of light emitting elements, and the plurality of light emitting elements may be connected in series, parallel, or series/parallel to each other.

The driving circuit GDC may include a scan driving circuit. The scan driving circuit may generate scan signals, and sequentially provide or output the scan signals to scan lines GL. The scan driving circuit may further provide another control signal to driving circuits of the pixels PX.

The scan driving circuit may include thin film transistors formed through the same process as that of the driving circuits, e.g., a Low Temperature Polycrystalline Silicon (LTPS) process or a Low Temperature Polycrystalline Oxide (LTPO) process.

The signal wirings SGL may include the scan lines GL, data lines DL, a power line PL, and a control signal line CSL. Each of the scan lines GL may be connected to a corresponding pixel among the pixels PX, and each of the data lines DL may be connected to a corresponding pixel among the pixels PX. The power line PL may be connected to the pixels PX. The control signal line CSL may provide control signals to the scan driving circuit.

The signal wirings SGL may overlap with the display area DP-DA and the non-display area DP-NDA. The signal wirings SGL may include a pad part (or pad portion) and a line part (or line portion). The line part may overlap with the display area DP-DA and the non-display area DP-NDA. The pad part may be connected to an end of the line part. The pad part may be disposed in the non-display area DP-NDA, and overlap with a corresponding signal pad among the signal pads DP-PD. An area in which the signal pads DP-PD are disposed in the non-display area DP-NDA may be defined as a pad area NDA-PD.

The line part connected to the pixels PX may constitute most of the signal wirings SGL. The line part may be connected to transistors of the pixels PX. The line part may have a single-layer/multi-layer structure. The line part may be a single body or include two or more portions. The two or more portions may be disposed on different layers, and be connected to each other through a contact hole penetrating an insulating layer disposed between the two or more portions.

The display panel DP may further include dummy pads IS-DPD disposed in the pad area NDA-PD. Since the dummy pads IS-DPD are formed through the same process as the signal wirings SGL, the dummy pads IS-DPD may be disposed on the same layer as the signal wirings SGL. The dummy pads IS-DPD may be selectively provided in the display device 100 including an input sensing layer (e.g., a touch sensor layer), and be omitted in the display device 100 including an input sensing panel (e.g., a touch panel).

In FIG. 3, a circuit board PCB electrically connected to the display panel DP is additionally illustrated. The circuit board PCB may be a flexible circuit board or a rigid circuit board. The circuit board PCB may be coupled directly to the display panel DP, or be connected to the display panel DP through another circuit board.

The timing control circuit TC which controls an operation of the display panel DP may be disposed on the circuit board PCB. The timing control circuit TC may receive input image data and timing signals (e.g., a vertical synchronization signal, a horizontal synchronization signal, and clock signals) from the outside (e.g., a host system such as an application processor), generate a gate driving control signal for controlling the driving circuit GDC, based on the timing signals, and provide the gate driving control signal to the driving circuit GDC. The vertical synchronization signal among the timing signals may define the start of one display period (or one frame) in which an image (or frame image) of the one frame is displayed, or define the start (transmission start) of image data corresponding to the one frame. The horizontal synchronization signal among the timing signals may define a period in which each of the images of a horizontal line, which are included in the image of one frame (e.g., a line image displayed through pixels included in the same row), is output. Also, the timing control circuit TC may generate a data driving control signal for controlling the data driver, provide the data driving control signal to the data driver, and realign the input image data and then provide the realigned input image data to the data driver.

In addition, an input sensing circuit ISC which controls the touch sensor TS may be disposed on the circuit board PCB. The input sensing circuit ISC may receive a timing signal (e.g., a vertical synchronization signal from the outside (e.g., a host system such as an application processor) and generate a driving signal (or touch driving signal) based on the vertical synchronization signal. Also, the input sensing circuit ISC may receive a sensing signal corresponding to an external input (e.g., a touch input of a user) from the touch sensor TS, and calculate or recognize a position of the external input (e.g., the touch input) based on the sensing signal.

In an embodiment, each of the timing control circuit TC and the input sensing circuit ISC may be mounted on the circuit board PCB in the form of an integrated circuit chip. In another embodiment, the timing control circuit TC and the input sensing circuit ISC may be mounted on the circuit board PCB in the form of one integrated circuit chip. The circuit board PCB may include circuit board pads PCB-P electrically connected to the display panel DP. The circuit board PCB may further include signal lines for connecting the circuit board pads PCB-P to the timing control circuit TC and/or the input sensing circuit ISC.

Figure 4:
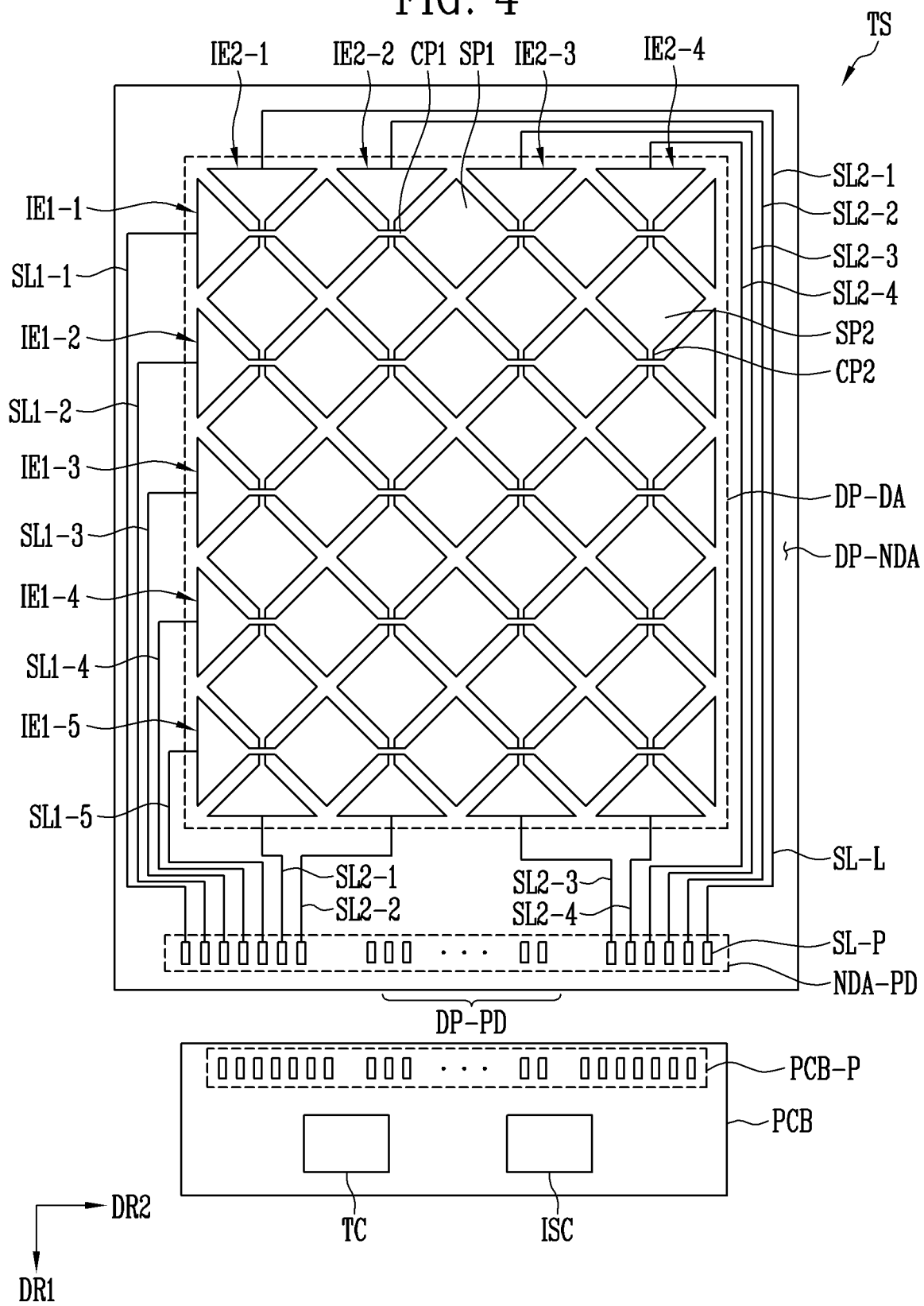
FIG. 4 is a plan view illustrating an example of a touch sensor included in the display device shown in FIG. 2.

FIG. 4 is a plan view illustrating an example of the touch sensor included in the display device shown in FIG. 2.

Referring to FIGS. 1 to 4, a touch sensor TS may include first sensing electrodes IE1-1, IE1-2, IE1-3, IE1-4, and IE1-5, first signal lines SL1-1, SL1-2, SL1-3, SL1-4, and SL1-5 respectively connected to the first sensing electrodes IE1-1, IE1-2, IE1-3, IE1-4, and IE1-5, second sensing electrodes IE2-1, IE2-2, IE2-3, and IE2-4, and second signal lines SL2-1, SL2-2, SL2-3, and SL2-4 respectively connected to the second sensing electrodes IE2-1, IE2-2, IE2-3, and IE2-4.

The first sensing electrodes IE1-1 to IE1-5 and the second sensing electrodes IE2-1 to IE2-4 may be disposed in a touch sensing area corresponding to the display area DP-DA.

The first sensing electrodes IE1-1 to IE1-5 and the second sensing electrodes IE2-1 to IE2-4 may be disposed to intersect each other. For example, the first sensing electrodes IE1-1 to IE1-5 extend in the second direction DR2 and may be arranged along the first direction DR1. The second sensing electrodes IE2-1 to IE2-4 extend in the first direction DR1 and may be arranged along the second direction DR2. The touch sensor TS may sense an external input in a mutual cap manner and/or a self-cap manner.

Each of the first sensing electrodes IE1-1 to IE1-5 includes first sensor parts SP1 that are connected by first connection parts CP1. Each of the second sensing electrodes IE2-1 to IE2-4 includes second sensor parts SP2 that are connected by second connection parts CP2.

In an embodiment, the first sensing electrodes IE1-1 to IE1-5 and the second sensing electrodes IE2-1 to IE2-4 may have a shape (e.g., a bar shape) in which sensor parts and connection parts are not distinguishable from each other. Although the first and second sensor parts SP1 and SP2 having a rhombic shape are exemplarily illustrated in FIG. 4, the present disclosure is not limited thereto, and the first and second sensor parts SP1 and SP2 may be implemented in various shapes.

In an embodiment, the first sensing electrodes IE1-1 to IE1-5 and the second sensing electrodes IE2-1 to IE2-4 may be formed in a mesh pattern.

First sensor parts SP1 of a first sensing electrode are arranged along the second direction DR2, and second sensor parts SP2 in one second sensing electrode are arranged along the first direction DR1. Each first connection part CP1 connects adjacent first sensor parts SP1 to each other, and each second connection part CP2 connects adjacent second sensor parts SP2 to each other.

In an embodiment, the first connection parts CP1, the first sensor parts SP1, and the second sensor parts SP2 may be disposed in the same layer, and the second connection parts CP2 may be disposed in a layer different from the layer in which the first connection parts CP1, the first sensor parts SP1, and the second sensor parts SP2 are disposed. Accordingly, the first sensing electrodes IE1-1 to IE1-5 and the second sensing electrodes IE2-1 to IE2-4 are not short-circuited with each other.

The first signal lines SL1-1 to SL1-5 may be respectively connected to first ends of the first sensing electrodes IE1-1 to IE1-5. The second signal lines SL2-1 to SL2-4 may be connected to both ends of the second sensing electrodes IE2-1 to IE2-4. The first signal lines SL1-1 to SL1-5 and the second signal lines SL2-1 to SL2-4 may extend into the non-display area DP-NDA.

In an embodiment, the first signal lines SL1-1 to SL1-5 may be connected to both ends of the first sensing electrodes IE1-1 to IE1-5. In an embodiment, the second signal lines SL2-1 to SL2-4 may be respectively connected to only the first ends of the second sensing electrodes IE2-1 to IE2-4.

Each of the first signal lines SL1-1 to SL1-5 and the second signal lines SL2-1 to SL2-4 may include a line part SL-L and a pad part SL-P. The line part SL-L may be connected to one of pads arranged in a pad area NDA-PD.

However, this is merely illustrative, and the planar shape of the touch sensor TS is not a limitation.

In an embodiment, the touch sensor TS may further include a dummy electrode (or optical dummy electrode) disposed while being spaced apart from the first sensing electrodes IE1-1 to IE1-5 and the second sensing electrodes IE2-1 to IE2-4.

Also, the touch sensor TS may further include an antenna pattern disposed while being spaced apart from the first sensing electrodes IE1-1 to IE1-5 and the second sensing electrodes IE2-1 to IE2-4. The antenna pattern may be disposed in the display area DP-DA.

An antenna signal line connected to the antenna pattern may extend to the non-display area DP-NDA. One end of the antenna signal line may be connected to an antenna pad disposed in the non-display area DP-NDA. The antenna pattern, the antenna signal line, and the antenna pad will be described in more detail below with reference to FIG. 5.

Figure 5:
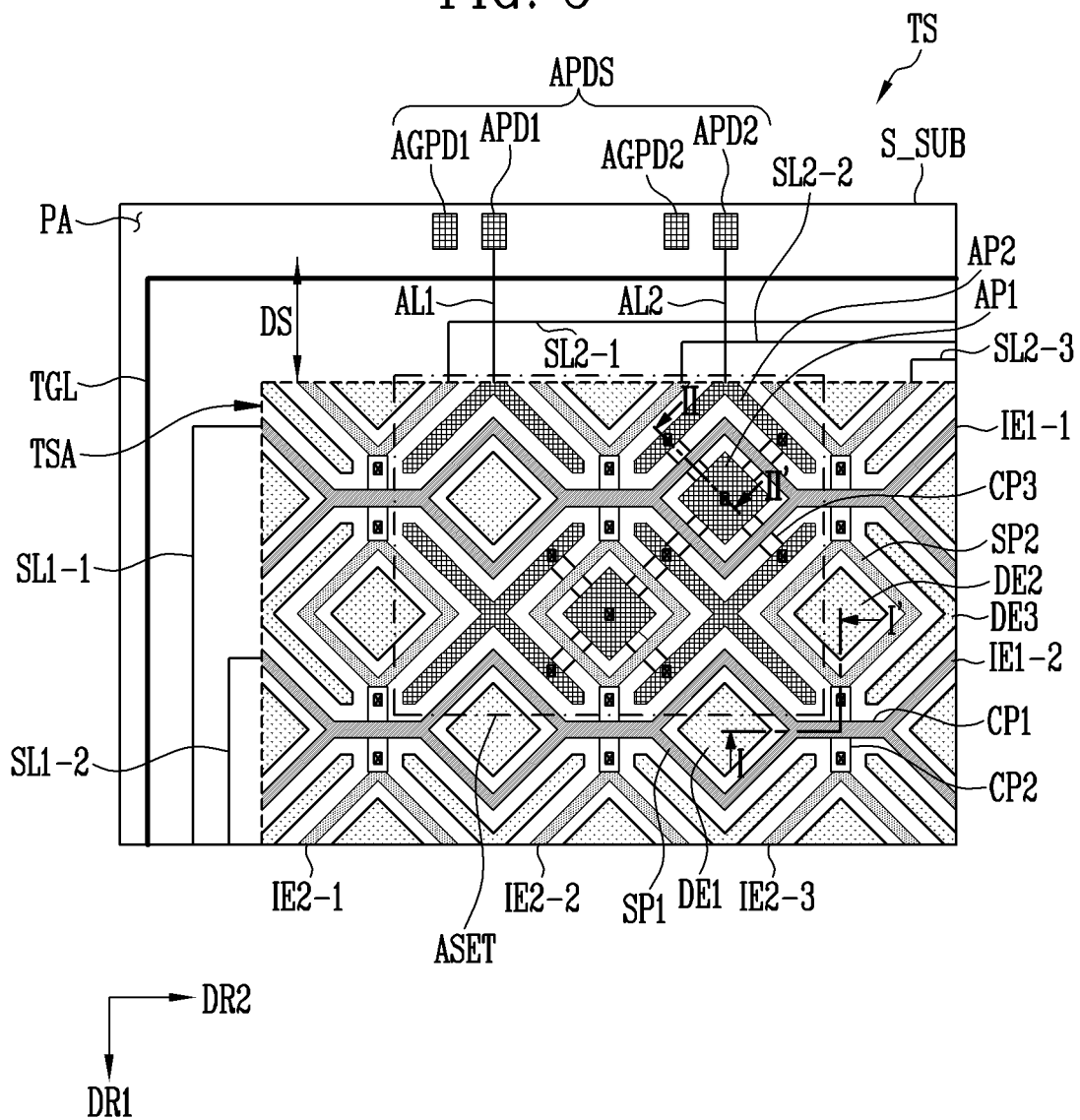
FIG. 5 is an enlarged view illustrating an example of a portion of the touch sensor shown in FIG. 4.

FIG. 5 is an enlarged view illustrating an example of a portion of the touch sensor shown in FIG. 4.

Referring to FIGS. 4 and 5, the touch sensor TS may include first sensing electrodes IE1-1 and IE1-2, first signal lines SL1-1 and SL1-2, second sensing electrodes IE2-1, IE2-2, and IE2-3, second signal lines SL2-1, SL2-2, and SL2-3, dummy electrodes DE1, DE2, and DE3, antenna patterns AP1 and AP2, antenna signal lines AL1 and AL2, and antenna pads APDS.

The first sensing electrodes IE1-1 and IE1-2, the first signal lines SL1-1 and SL1-2, the second sensing electrodes IE2-1, IE2-2, and IE2-3, the second signal lines SL2-1, SL2-2, and SL2-3, the dummy electrodes DE1, DE2, and DE3, the antenna patterns AP1 and AP2, the antenna signal lines AL1 and AL2, and the antenna pads APDS may be disposed on a sensor substrate S_SUB.

The sensor substrate S_SUB (or touch sensor substrate) may include a touch sensing area TSA and a peripheral area PA. The touch sensing area TSA may overlap with a display area (e.g., the display area DP-DA shown in FIG. 4).

The peripheral area PA may be an area adjacent to the touch sensing area TSA.

The first sensing electrodes IE1-1 and IE1-2, the dummy electrodes DE1, DE2, and DE3, and the antenna patterns AP1 and AP2 may be disposed in the touch sensing area TSA.

Each of the first sensing electrodes IE1-1 and IE1-2 may include a first sensor part SP1 and a first connection part CP1. Each of the second sensing electrodes IE2-1, IE2-2, and IE2-3 may include a second sensor part SP2 and a second connection part CP2. In an embodiment, each of the first sensor part SP1 and the second sensor part SP2 may include an opening. For example, the first sensor part SP1 and the second sensor part SP2 may have a planar shape resembling a rhombus with an opening. In the examples shown, the opening also has a rhombus shape that matches the shape of the sensor part first SP1 or the second sensor part SP2; however, this is not a limitation of the disclosure.

A dummy electrode or an antenna pattern may be disposed in the openings of the first sensor part SP1 and the second sensor part SP2.

A first dummy electrode DE1 may be disposed in the opening of the first sensor part SP1 and be spaced apart from the first sensor part SP1. A second dummy electrode DE2 may be disposed in the opening of the second sensor part SP2 and be spaced apart from the second sensor part SP2. In one embodiment, the first dummy electrode DE1 and the second dummy electrode DE2 may have a rhombic shape.

A third dummy electrode DE3 may be disposed between the first sensing electrodes IE1-1 and IE1-2 and the second sensing electrodes IE2-1, IE2-2, and IE2-3.

Each of the first to third dummy electrodes DE1 to DE3 may be formed as an island and be a floating electrode. In some embodiments, at least a portion of the first to third dummy electrodes DE1 to DE3 may be omitted.

The antenna patterns AP1 and AP2 and the antenna signal lines AL1 and AL2 may be used for wireless communication with the outside of a display device (e.g., the display device 100 shown in FIG. 1). For example, an antenna element including the antenna patterns AP1 and AP2 and the antenna signal lines AL1 and AL2 may transmit, receive, or transmit/receive a wireless frequency signal (e.g., an electromagnetic wave) and/or an alternating current (AC) voltage signal obtained by converting the wireless frequency signal.

The antenna patterns AP1 and AP2 may be disposed in the touch sensing area TSA. Therefore, even though an electronic device including the touch sensor TS becomes small and thin, or the area of the peripheral area PA is reduced, the area of the touch sensing area TSA is secured. Hence, a space in which an antenna is disposed can be easily secured.

The antenna patterns AP1 and AP2 may have a shape similar to the shape of the first to third dummy electrodes DE1 to DE3. A first antenna pattern AP1 may be disposed in the opening of the first sensor part SP1 or the opening of the second sensor part SP2. For example, the first antenna pattern AP1 may have a rhombic shape.

A second antenna pattern AP2 may be disposed in a space between the first sensing electrodes IE1-1 and IE1-2 and the second sensing electrodes IE2-1, IE2-2, and IE2-3. In the example shown in FIG. 5, the second antenna pattern AP2 has an 'X' shape.

The first dummy electrode DE1, the second dummy electrode DE2, the third dummy electrode DE3, the first antenna pattern AP1, and the second antenna pattern AP2 may be disposed on the same layer.

A predetermined first antenna pattern AP1 and a predetermined second antenna pattern AP2 may be connected to each other by a third connection part CP3. The third connection part CP3 may be disposed in a layer different from a layer in which the first antenna pattern AP1 and the second antenna pattern AP2 are disposed. For example, the third connection part CP3 may be disposed on the same layer as the second connection part CP2. Accordingly, the antenna patterns AP1 and AP2 and the sensing electrodes IE1-1, IE1-2, IE2-1, IE2-2, and IE2-3 are not short-circuited with each other.

In an embodiment, the predetermined first antenna pattern AP1, the predetermined second antenna pattern AP2 and the third connection part CP3 connecting the same may constitute one antenna set ASET. For example, as shown in FIG. 5, the one antenna set ASET may include two first antenna patterns AP1 and second antenna patterns AP2 disposed in a space between the first sensing electrodes IE1-1 and IE1-2 and the second sensing electrodes IE2-1, IE2-2, and IE2-3 to be connected to the first antenna patterns AP1 through the third connection part CP3. However, this is merely illustrative, and the embodiment of the present disclosure is not limited thereto. For example, the one antenna set ASET may include one first antenna pattern AP1 or include three or more first antenna patterns AP1.

The antenna signal lines AL1 and AL2 may be connected to the antenna set ASET. For example, one end of each of the antenna signal lines AL1 and AL2 may be connected to one end of one of antenna patterns AP1 and AP2 corresponding thereto. The other end of each of the antenna signal lines AL1 and AL2 may be connected to one of antenna pads APDS corresponding thereto.

The antenna signal lines AL1 and AL2 may extend not to be short-circuited with the first signal lines SL1-1 and SL1-2 and the second signal lines SL2-1, SL2-2, and SL2-3. For example, the antenna signal lines AL1 and AL2 may overlap with at least a portion of the first signal lines SL1-1 and SL1-2 and the second signal lines SL2-1, SL2-2, and SL2-3, but be disposed not to be in contact with the first signal lines SL1-1 and SL1-2 and the second signal lines SL2-1, SL2-2, and SL2-3.

The antenna signal lines AL1 and AL2 may be disposed to extend to the peripheral area PA.

The antenna pads APDS may include antenna signal pads APD1 and APD2 and ground pads AGPD1 and AGPD2. The antenna pads APDS may be disposed in the peripheral area PA. The antenna pads APDS may include a conductive material.

A first antenna signal line AL1 may be connected to a first antenna signal pad APD1, and a second antenna signal line AL2 may be connected to a second antenna signal pad APD2. The first and second antenna signal pads APD1 and APD2 may transfer an AC signal to the antenna set ASET (e.g., the antenna patterns AP1 and AP2) through the antenna signal lines AL1 and AL2.

The ground pads AGPD1 and AGPD2 may be connected to a ground of a device (e.g., a ground of the display panel or a system ground), or the like through a predetermined contact hole or the like. Also, at least a portion of the ground pads AGPD1 and AGPD2 may be electrically connected to at least a portion of the antenna signal lines AL1 and AL2.

In an embodiment, a touch ground line TGL may be disposed in the peripheral area PA of the sensor substrate S_SUB to surround the touch sensing area TSA. The touch ground line TGL may perform a function of electrostatic discharge protection, or the like.

Meanwhile, as described with reference to FIG. 5, the antenna set ASET including the antenna patterns AP1 and AP2 is disposed on the touch sensing area TSA of the sensor substrate S_SUB, and therefore, a signal interference may occur between the antenna patterns AP1 and AP2 included in the antenna set ASET and the sensor parts SP1 and SP2. For example, when an external input (e.g., a touch input of a user, or the like) occurs due to an object (e.g., a finger of the user, or the like) on the touch sensing area TSA, a wireless frequency signal transmitted, received, or transmitted/received on wireless communication between the antenna element including the antenna patterns AP1 and AP2 and the antenna signal lines AL1 and AL2 and the outside of the display device (e.g., the display device 100 shown in FIG. 1) may be attenuated by the object. The signal quality of the wireless frequency signal transmitted, received, or transmitted/received on the wireless communication and/or an AC voltage or the like, obtained by converting the wireless frequency signal, is deteriorated, and therefore, deterioration of wireless communication quality may occur. In accordance with embodiments of the present disclosure, a plurality of antenna sets ASET may be disposed on the touch sensing area TSA of the touch sensor TS, and an antenna set ASET suitable for a current use environment among the plurality of antenna sets ASET may be selected according to wireless communication quality determined based on a sensing signal corresponding to an external input (e.g., a touch input of a user, or the like), to be used in wireless communication. This will be described in more detail with reference to FIGS. 8 to 11C.

Figure 6:
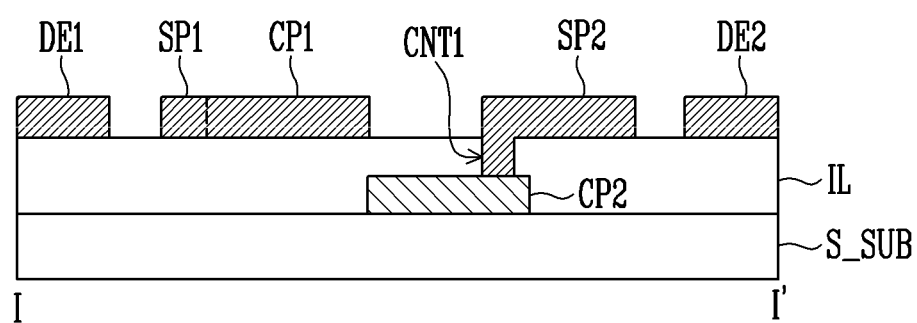
FIG. 6 is a sectional view illustrating an example taken along line I-I' of the touch sensor shown in FIG. 5.
Figure 7:
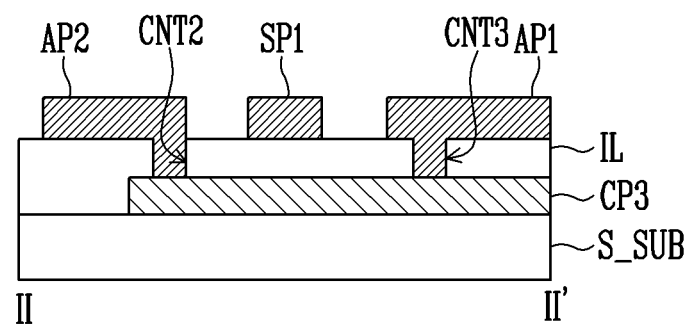
FIG. 7 is a sectional view illustrating an example taken along line II-II' of the touch sensor shown in FIG. 5.

FIG. 6 is a sectional view illustrating an example taken along line I-I' of the touch sensor shown in FIG. 5. FIG. 7 is a sectional view illustrating an example taken along line II-II' of the touch sensor shown in FIG. 5.

Referring to FIGS. 2, 5, 6, and 7, the touch sensor TS may be formed by conductive patterns disposed on the sensor substrate S_SUB.

The sensor substrate S_SUB may serve as a base layer (base film, or base panel) of the touch sensor TS. The sensor substrate S_SUB may be made of a material which is transparent and has flexibility.

For example, the sensor substrate S_SUB may include an inorganic insulating layer including at least one of silicon oxide, silicon nitride, and silicon oxynitride.

Alternatively, the sensor substrate S_SUB may include a transparent polymer organic material. For example, the sensor substrate S_SUB may include photoresist, acrylic-based polymer, polyimide-based polymer, polyamide-based polymer, siloxane-based polymer, novolak resin, alkali-soluble resin, and the like. These may be used alone or in a combination thereof.

In an embodiment, the sensor substrate S_SUB may be a transparent insulating layer disposed directly on the encapsulation layer of the display panel DP.

In an embodiment, an uppermost layer of the encapsulation layer of the display panel DP may serve as the sensor substrate S_SUB. For example, the second connection part CP2 and the third connection part CP3 may be disposed on the uppermost layer of the encapsulation layer.

In an embodiment, the sensor substrate S_SUB may be attached in a panel form onto the display panel DP by an optically clear adhesive.

A first conductive layer including the second connection part CP2 and the third connection part CP3 may be provided on the sensor substrate S_SUB. The first sensor part SP1, the second sensor part SP2, the dummy electrodes DE1, DE2, and DE3, the first antenna pattern AP1, the second antenna pattern AP2, and the first connection part CP1 may be formed by a second conductive layer on the first conductive layer.

However, this is merely illustrative and not a limitation. For example, in another embodiment, the first conductive layer may include the first sensor part SP1, the second sensor part SP2, the dummy electrodes DE1, DE2, and DE3, the first antenna pattern AP1, the second antenna pattern AP2, and the first connection part CP1, and the second conductive layer may include the second connection part CP2 and the third connection part CP3.

In an embodiment, the first conductive layer may include an opaque metal. For example, the first conductive layer may include molybdenum, silver, titanium, copper, aluminum, and alloys thereof. The first conductive layer may have a multi-layer metal layer structure. For example, the first conductive layer may have a triple-layer structure of molybdenum (Mo)/aluminum (Al)/molybdenum (Mo). However, this is merely illustrative, and the first conductive layer may have a triple-layer structure of titanium (Ti)/aluminum (Al)/titanium (Ti).

In an embodiment, the first conductive layer may include a transparent conductive material. For example, the transparent conductive material may include a transparent conductive oxide such as indium tin oxide (ITO), indium zinc oxide (IZO), zinc oxide (ZnO), or indium tin zinc oxide (ITZO). In addition, the transparent conductive material may include conductive polymer such as poly(3,4-ethylenedioxythiophene) (PEDOT), metal nano wires, graphene, and the like.

The second connection part CP2 and the third connection part CP3 may be formed through patterning using various manners including dry etching, wet etching, and the like on a conductive material deposited on the sensor substrate S_SUB.

In an embodiment, the third connection part CP3 may be provided to overlap with the first sensor part SP1, the second sensor part SP2, the first antenna pattern AP1, and/or the second antenna pattern AP2, which are disposed above the third connection part CP3.

An insulating layer IL may be provided on the sensor substrate S_SUB to cover the first conductive layer including the second connection part CP2 and the third connection part CP3. The insulating layer IL may include an organic insulating material and/or an inorganic insulating material. The insulating layer IL may be patterned to have contact holes CNT1, CNT2, and CNT3.

The second conductive layer may be provided on the insulating layer IL. In an embodiment, the second conductive layer may include the first sensor part SP1, the second sensor part SP2, the dummy electrodes DE1, DE2, and DE3, the first antenna pattern AP1, the second antenna pattern AP2, and the first connection part CP1.

The second sensor part SP2 may be connected to the second connection part CP2 through the first contact hole CNT1.

The second antenna pattern AP2 may be connected to the third connection part CP3 through a second contact hole CNT2, and the first antenna pattern AP1 may be connected to the third connection part CP3 through a third contact hole CNT3. Therefore, the first antenna pattern AP1 and the second antenna pattern AP2, which correspond to each other, may be electrically connected to each other.

In an embodiment, the second conductive layer may include the above-described transparent conductive material. Alternatively, the second conductive layer may include the above-described opaque metal.

The first conductive layer and the second conductive layer may have the same material, and may also include different materials.

As described above, the sensor parts SP1 and SP2 and the antenna patterns AP1 and AP2 may be disposed while being spaced apart from each other on the same layer in the touch sensing area TSA.

Figure 8:
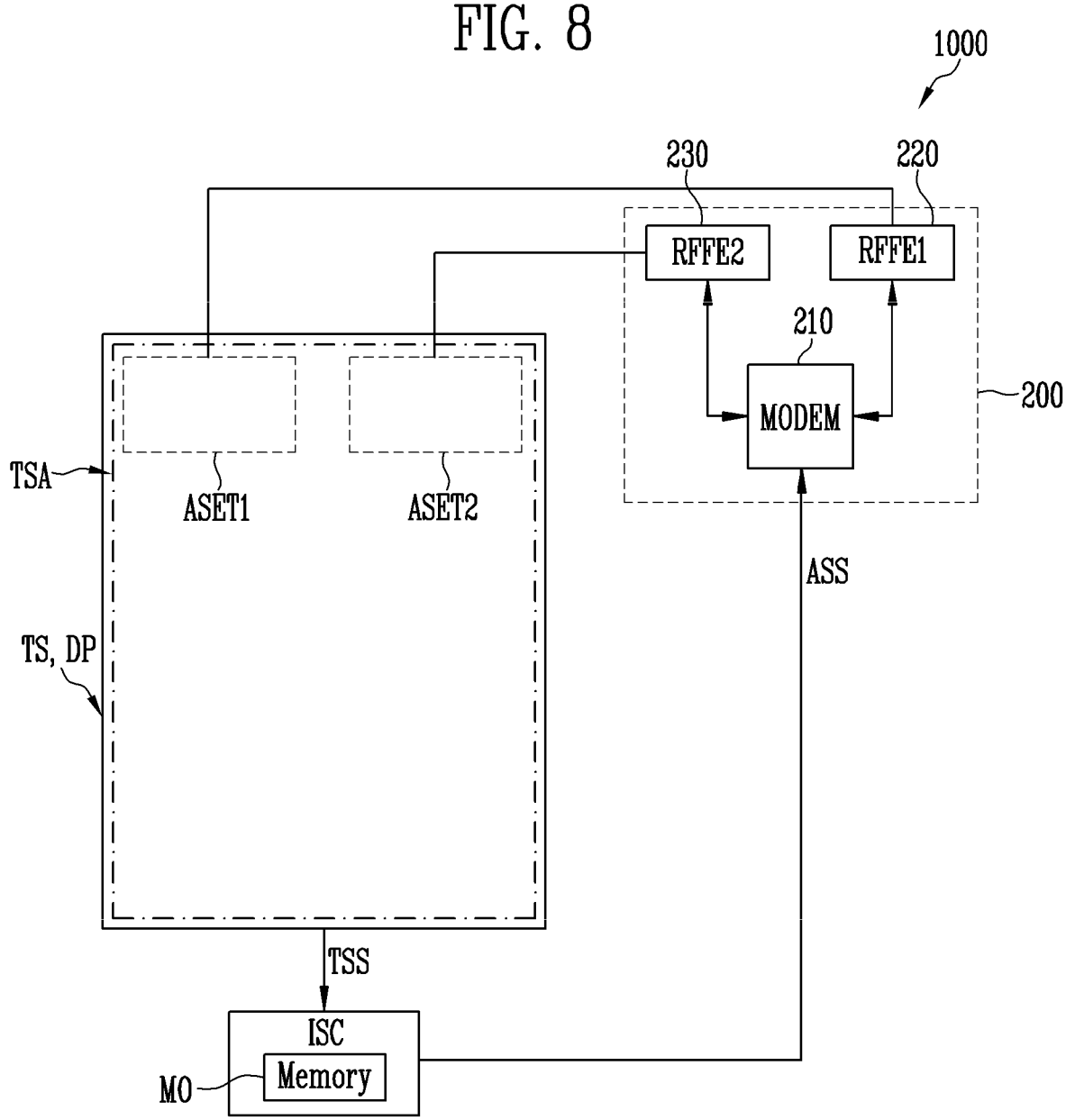
FIG. 8 is a block diagram illustrating an electronic device in accordance with embodiments of the present disclosure.

FIG. 8 is a block diagram illustrating an electronic device in accordance with embodiments of the present disclosure.

Referring to FIGS. 2, 3, 4, 5, and 8, the electronic device 1000 in accordance with the embodiments of the present disclosure may include a display device 100 and an antenna module 200.

In some embodiments, the display device 100 included in the electronic device 1000 may be substantially identical to the display device 100 described with reference to FIGS. 2 to 5. For example, the display device 100 may include a display panel DP, a touch sensor TS, and an input sensing circuit ISC. In an example, antenna sets ASET1 and ASET2 each including antenna patterns AP1 and AP2 may be disposed in the touch sensor TS. Meanwhile, for convenience of description, a case where two antenna sets ASET1 and ASET2 are disposed on a touch sensing area TSA of the touch sensor TS is illustrated in FIG. 8. However, this is merely illustrative, and the number of antenna sets disposed on the touch sensing area TSA is not limited thereto.

The antenna module 200 may include a modem 210, a first front end (RFFE1) 220, and a second front end (RFFE2) 230.

The modem 210 may transfer and process a signal associated with a receiving, transmitting, or transmitting/receiving operation of the electronic device 1000. In an embodiment, the modem 210 may modulate a signal to be transmitted through the antenna sets ASET1 and ASET2 connected through the front ends 220 and 230. Also, the modem 210 may process decoding of a signal received through the antenna sets ASET1 and ASET2 connected through the front ends 220 and 230.

In some embodiments, although not separately shown in FIG. 8, the antenna module 200 may further include a transceiver connected between the modem 210 and the front ends 220 and 230. The transceiver may convert a transmission baseband signal into a radio frequency (RF) signal, or covert a received RF signal into a baseband signal. The transceiver may select a path based on a communication scheme with respect to a transmission RF signal and transfer the transmission RF signal to the first front end 220 and/or the second front end 230. In some embodiments, the transceiver may convert a baseband signal into RF signals in various bands. For example, the transceiver may convert a baseband signal into a 5G-based RF signal in 6 GHz band or lower, or an RF signal into 2G, 3G, and 4G-based RF signals. Also, the transceiver may convert a baseband signal into a 5G-based RF signal in 6 GHz band or higher, or an RF signal in a microwave frequency band.

The first front end 220 may include a transmitting circuit and a receiving circuit. For example, the first front end 220 may be an LNA power amplifier module with integrated duplexer (LPAMID) front end including a duplexer, a plurality of low noise amplifiers (LNAs), a plurality of Rx filters, a plurality of power amplifiers, and a plurality of switches.

The first front end 220 may be electrically connected to a first antenna set ASET1. For example, as described with reference to FIG. 5, predetermined antenna patterns (e.g., the first antenna pattern AP1 and the second antenna pattern AP2, which are shown in FIG. 5) included in the first antenna set ASET1 may be connected to corresponding antenna pads (e.g., the antenna pads APDS shown in FIG. 5) through antenna signal lines (e.g., the first antenna signal line AL1 and the second antenna signal line AL2, which are shown in FIG. 5), and the first front end 220 may be electrically connected to the first antenna set ASET1 through a signal line connecting the antenna pads and the first front end 220 to each other.

The second front end 230 may include a transmitting circuit and a receiving circuit. For example, the second front end 230 may be an LNA power amplifier module in duplexer (LPAMID) front end including a duplexer, a plurality of low noise amplifiers (LNAs), a plurality of Rx filters, a plurality of power amplifiers, and a plurality of switches.

The second front end 230 may be electrically connected to a second antenna set ASET2. For example, as described with reference to FIG. 5, predetermined antenna patterns (e.g., the first antenna pattern AP1 and the second antenna pattern AP2, which are shown in FIG. 5) included in the second antenna set ASET2 may be connected to corresponding antenna pads (e.g., the antenna pads APDS shown in FIG. 5) through antenna signal lines (e.g., the first antenna signal line AL1 and the second antenna signal line AL2, which are shown in FIG. 5), and the second front end 230 may be electrically connected to the second antenna set ASET2 through a signal line connecting the antenna pads and the second front end 230 to each other.

In an embodiment, as described with reference to FIG. 5, the electronic devices 1000 in accordance with the embodiments of the present disclosure may determine wireless communication quality, based on a sensing signal TSS (or touch sensing signal) corresponding to an external input (e.g., a touch input of a user, or the like), and select an antenna set suitable for a current use environment (from the antenna sets ASET1 and ASET2) according to the wireless communication quality. The selected antenna set is used in wireless communication. For example, when the first antenna set ASET1 selected from the antenna sets ASET1 and ASET2 is used for wireless communication, the electronic device 1000 in accordance with the embodiments of the present disclosure may select the second antenna set ASET2 disposed in an area different from an area of the first antenna set ASET1, which corresponds to an area in which an external input occurs, and use the second antenna set ASET2 in wireless communication (e.g., handover (or switch) between the antenna sets ASET1 and ASET2). The antenna set that is used may be dynamically adjusted based on the sensing signal TSS that indicates whether the external input occurs in an area corresponding to the first antenna set ASET1 or the second antenna set ASET2 in the touch sensing area TSA.

More specifically, the input sensing circuit ISC may include a memory MO which pre-stores position information of the antenna sets ASET1 and ASET2 on the touch sensing area TSA. For example, the memory MO may include position information (e.g., first position information) of the first antenna set ASET1 on the touch sensing area TSA and position information (e.g., second position information) of the second antenna set ASET2 on the touch sensing area TSA.

In an embodiment, the input sensing circuit ISC may receive a sensing signal TSS from the touch sensor TS, and determine whether an external input (e.g., a touch input of a user) has occurred on an area in which the antenna sets ASET1 and ASET2 are disposed, based on the sensing signal TSS.

For example, when it is determined that a sensing signal TSS corresponding to the area in which the first antenna set ASET1 is disposed is a predetermined threshold value or more, the input sensing circuit ISC may determine that the external input (e.g., the touch input of the user) occurred in the area in which the first antenna set ASET1 is disposed by using the position information (e.g., the first position information) stored in the memory MO. In another example, when it is determined that a sensing signal TSS corresponding to the area in which the second antenna set ASET2 is disposed is the predetermined threshold value or more, the input sensing circuit ISC may determine that the external input (e.g., the touch input of the user) occurred in the area in which the second antenna set ASET2 is disposed by using the position information (e.g., the second position information) stored in the memory MO. The input sensing circuit ISC may generate an antenna switching signal ASS including such determination result information (i.e., information on a result obtained by determining whether the external input has occurred on the area in which the antenna sets ASET1 and ASET2 are disposed), and provide the antenna switching signal ASS to the antenna module 200.

The modem 210 of the antenna module 200 may receive an antenna switching signal ASS, and determine whether an external input has occurred on the area in which the antenna sets ASET1 and ASET2 are disposed, based on the antenna switching signal ASS.

In an embodiment, the modem 210 may determine wireless communication quality of a currently used antenna set selected from the antenna set ASET1 and ASET2 by determining whether an external input has occurred on an area in which the currently used antenna set is disposed, based on the antenna switching signal ASS. For example, a case where the first antenna set ASET selected from the antenna sets ASET1 and ASET2 is used for current wireless communication is mainly described. As described with reference to FIG. 5, when an external input (e.g., a touch input of a user, or the like) occurs due to an object (e.g., a finger of the user, or the like) on the area in which the currently used first antenna set ASET1 is disposed in the touch sensing area TSA, a wireless frequency signal transmitted, received, or transmitted/received on wireless communication through the first antenna set ASET1 may be attenuated by the object. Accordingly, when it is determined according to the antenna switching signal ASS that the external input has occurred on the area in which the first antenna set ASET1 used for current wireless communication is disposed, the modem 210 may determine that the wireless communication quality of the first antenna set ASET1 is deteriorated.

Some embodiments avoid using the antenna set that is sensing a touch simultaneously for wireless communication. In these embodiments, in response to a determination that the wireless communication quality of the first antenna set ASET1 that is used for the current wireless communication is deteriorated, the modem 210 may switch to the second antenna set ASET2 disposed in an area different from the area in which the first antenna set ASET1 is disposed, and use the second antenna set ASET2 in wireless communication. For example, the modem 210 may perform a switch (or handover) from wireless communication using the first antenna set ASET1 to wireless communication using the second antenna set ASET2 on wireless communication. In an example, the modem 210 may perform a wireless communication switch between the antenna sets ASET1 and ASET2 in a soft handover manner, but the embodiment of the present disclosure is not limited thereto. For example, the modem 210 may perform a wireless communication switch between the antenna sets ASET1 and ASET2 in a hard handover manner.

As described above, the electronic device 1000 in accordance with the embodiments of the present disclosure determines wireless communication quality, based on a sensing signal TSS (or touch sensing signal) corresponding to an external input (e.g., a touch input of a user, or the like). Accordingly, the electronic device 1000 in accordance with the embodiments of the present disclosure selects an antenna set suitable for a current use environment from the antenna sets ASET1 and ASET2 and uses the selected antenna set in wireless communication, so that the quality of an antenna transmission/reception signal for wireless communication can be improved.

Meanwhile, the embodiment of the present disclosure is not limited thereto. For example, in an embodiment, when it is determined that the wireless communication quality of the first antenna set ASET1 used for current wireless communication is deteriorated, the modem 210 may suspend wireless communication of the first antenna set ASET1. The wireless communication quality of the first antenna set ASET1 may be periodically checked and, upon determining that the wireless communication quality of the first antenna set ASET1 is back to a satisfactory level, the first antenna set ASET1 may be open to being selected for wireless communication.

Figure 9:
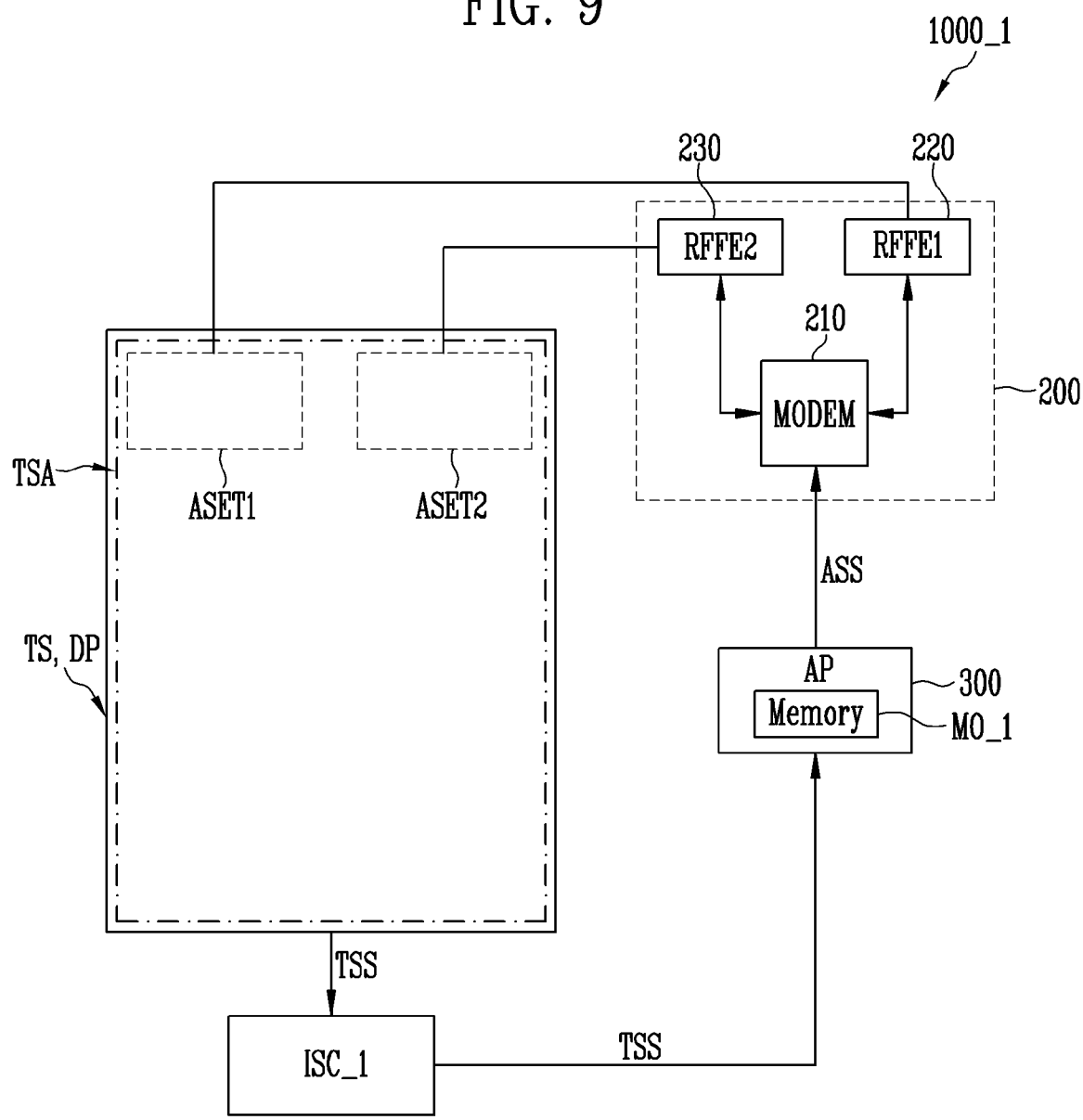
FIG. 9 is a block diagram illustrating an electronic device in accordance with embodiments of the present disclosure.

FIG. 9 is a block diagram illustrating an electronic device in accordance with embodiments of the present disclosure.

With respect to FIG. 9, portions that are substantially similar to those of the above-described embodiment will not be described, in the interest of avoiding redundancy. Hence, if any specific portion of the embodiment shown in FIG. 9 is not explicitly described, it is because that portion operates similarly to the corresponding portion in the above-described embodiment. In addition, identical reference numerals refer to identical components, and similar reference numerals refer to similar components.

FIG. 9 illustrates a modified embodiment of the embodiment shown in FIG. 8 in relation to configurations and operations of an input sensing circuit ISC_1 and a processor 300.

Referring to FIG. 9, the electronic device 1000_1 in accordance with the embodiments of the present disclosure may include a display device 100_1 and an antenna module 200. In an embodiment, the electronic device 1000_1 may further include the processor 300.

In an embodiment, the processor 300 may perform an operation of determining whether an external input occurred on an area where the antenna sets ASET1 and ASET2 are disposed in the touch sensing area TSA, based on the sensing signal TSS described above in reference to FIG. 8.

For example, the input sensing circuit ISC_1 may receive a sensing signal TSS from the touch sensor TS, and provide the sensing signal TSS to the processor 300.

The processor 300 may include a memory MO_1 which pre-stores position information of the antenna sets ASET1 and ASET2 on the touch sensing area TSA. The memory MO_1 shown in FIG. 9 is substantially identical or similar to the memory MO described with reference to FIG. 8, and therefore, redundant descriptions will not be provided.

In an embodiment, the processor 300 may determine whether an external input (e.g., a touch input of a user) has occurred on the area in which the antenna sets ASET1 and ASET2 are disposed based on the sensing signal TSS provided from the input sensing circuit ISC_1, and generate an antenna switching signal ASS including such determination result information and then provide the antenna switching signal ASS to the antenna module 200. A configuration in which the processor 300 shown in FIG. 9 generates the antenna switching signal ASS by determining whether the external input occurred on the area in which the antenna sets ASET1 and ASET2 are disposed may be substantially identical or similar to the configuration in which the input sensing circuit ISC described with reference to FIG. 8 generates the antenna switching signal ASS by determining whether the external input has occurred on the area in which the antenna sets ASET1 and ASET2 are disposed. Meanwhile, in the embodiment shown in FIG. 9, the antenna switching signal ASS provided from the processor 300 to the antenna module 200 may be a command signal.

Figure 10:
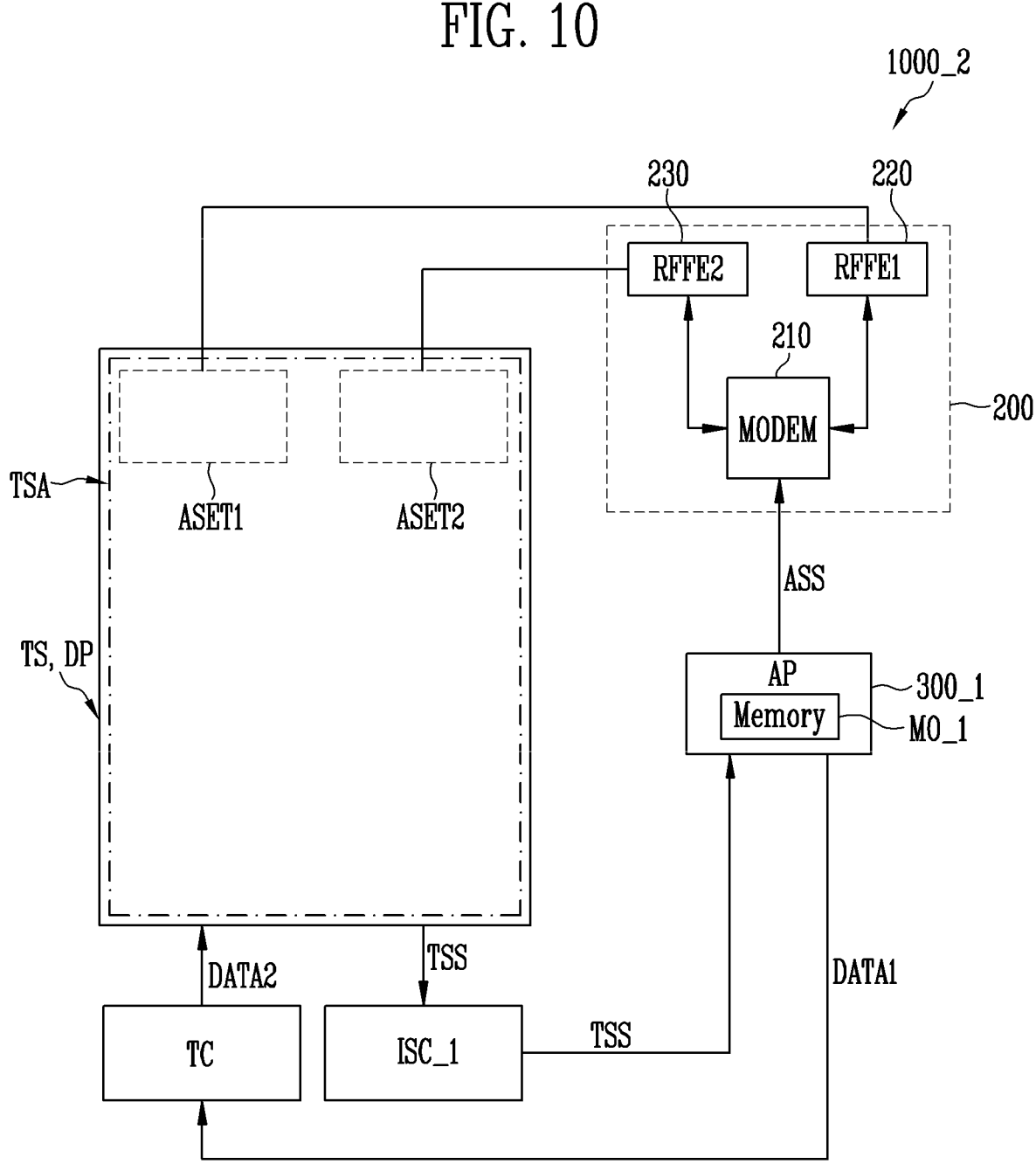
FIG. 10 is a block diagram illustrating an electronic device in accordance with embodiments of the present disclosure.
Figure 11A:
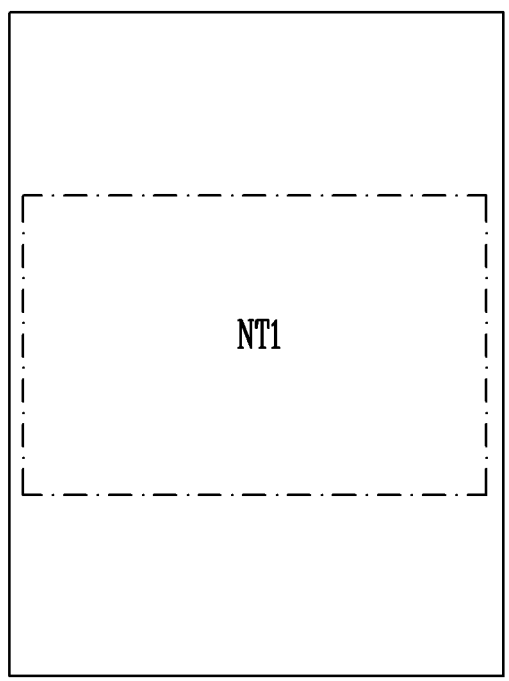

FIG. 10 is a block diagram illustrating an electronic device in accordance with embodiments of the present disclosure. FIGS. 11A to 11C are diagrams illustrating examples of an operation of the electronic device shown in FIG. 10.

With respect to FIGS. 10 and 11A to 11C, portions that are substantially similar to those of the above-described embodiment will not be described, in the interest of avoiding redundancy. Hence, if any portion of the embodiment shown in FIGS. 10 and 11A to 11C is not explicitly described, it is because that portion operates similarly to the corresponding portion in the above-described embodiment. In addition, identical reference numerals refer to identical components, and similar reference numerals refer to similar components.

FIG. 10 illustrates a modified embodiment of the embodiment shown in FIG. 9 in relation to configurations and operations of a display device 100_2 and a processor 300_1.

Referring to FIG. 10, the electronic device 1000_2 in accordance with the embodiments of the present disclosure may include the display device 100_2, an antenna module 200, and the processor 300_1.

In some embodiments, the display device 100_2 included in the electronic device 1000_2 may be substantially identical to the display device 100 described with reference to FIGS. 2 to 5. For example, the display device 100_2 may include a display panel DP, a touch sensor TS, a timing control circuit TC, and an input sensing circuit ISC_1.

As described with reference to FIG. 10, the timing control circuit TC may receive input image data (e.g., first data DATA1) and timing signals (e.g., a vertical synchronization signal, a horizontal synchronization signal, and clock signals) from the processor 300_1, and provide a data signal (e.g., second data DATA2) generated based on the input image data (e.g., the first data DATA1) to the display panel DP.

In an embodiment, the processor 300_1 may determine whether an external input has occurred on the area in which the antenna sets ASET1 and ASET2 are disposed in the touch sensing area TSA, based on a sensing signal TSS. When it is determined that the external input has occurred on the area in which the antenna sets ASET1 and ASET2 are disposed, the processor 300_1 may control a notice image for notifying a user that wireless communication is being performed through an antenna to display it on at least one partial area in the display area of a display panel DP.

For example, further referring to FIG. 11A together with FIG. 10, the timing control circuit TC of the display device 100_2 may provide the display panel DP with second data DATA2 for allowing a notice image for notifying a user that wireless communication is being performed through an antenna to be displayed in at least one partial area (e.g., a first area NT1) on the display area DP-DA of the display panel DP, based on the first data DATA1 provided from the processor 300_1.

In another example, further referring to FIG. 11B, the timing control circuit TC of the display device 100_2 may provide the display panel DP with second data DATA2 for allowing a notice image for notifying a user that wireless communication is being performed through an antenna to be displayed in a second area NT2 in which the antenna sets ASET1 and ASET2 are disposed on the display area DP-DA of the display panel DP, based on the first data DATA1 provided from the processor 300_1.

Accordingly, when an external input such as a user's intentional contact on the touch sensing area TSA or an accidental input from an arbitrary object on the touch sensing area TSA occurs in the area in which the antenna sets ASET1 and ASET2 are disposed in the touch sensing area TSA, the electronic device 1000_2 in accordance with the embodiments of the present disclosure may display a notice image for notifying the user that the external input occurred.

In an embodiment, the processor 300_1 may determine whether an external input has occurred on the area in which the antenna sets ASET1 and ASET2 are disposed in the touch sensing area TSA, based on the sensing signal TSS. When it is determined that the external input has occurred on the area in which the antenna sets ASET1 and ASET2 are disposed, the processor 300_1 may differently control frame frequencies of an area (e.g., a first display area) in which the antenna sets ASET1 and ASET2 are disposed and an area (e.g., an area as a second display area, which does not overlap with the first display area) in which the antenna sets ASET1 and ASET2 are not disposed in the display area of the display panel DP included in the display device 100_2, and/or a brightness (or luminance) of an image displayed in the display area.

For example, further referring to FIG. 11C, the timing control circuit TC may control a frame frequency of a first display area DA1 in which the antenna sets ASET1 and ASET2 are disposed in the display area DP-DA to be lower than a frame frequency of a second display area DA2 in which the antenna sets ASET1 and ASET2 are not disposed, based on the timing signals provided from the processor 300_1.

In another example, the timing control circuit TC may control a brightness (or luminance) of the first display area DA1 in which the antenna sets ASET1 and ASET2 are disposed in the display area DP-DA to be lower than a brightness (or luminance) of the second display area DA2 in which the antenna sets ASET1 and ASET2 are not disposed, based on the first data DATA1 provided from the processor 300_1.

As described above, a frame frequency and/or a brightness (or luminance) of the first display area DA1 in which the antenna sets ASET1 and ASET2 are disposed in the display area DP-DA is controlled to be lower than a frame frequency and/or a brightness (or luminance) of the second display area DA2 in which the antenna sets ASET1 and ASET2 are not disposed, a value (magnitude) or frequency of signals provided to display elements disposed in the first display area DA1 is lower than a value (magnitude) or frequency of signals provided to display elements disposed in the second display area DA2. Thus, an attenuation phenomenon of a wireless frequency signal, which may occur on wireless communication between the outside and an antenna element due to an external input on the first display area DA1 in which the antenna sets ASET1 and ASET2 are disposed can be reduced (e.g., eliminated).

Figure 12:
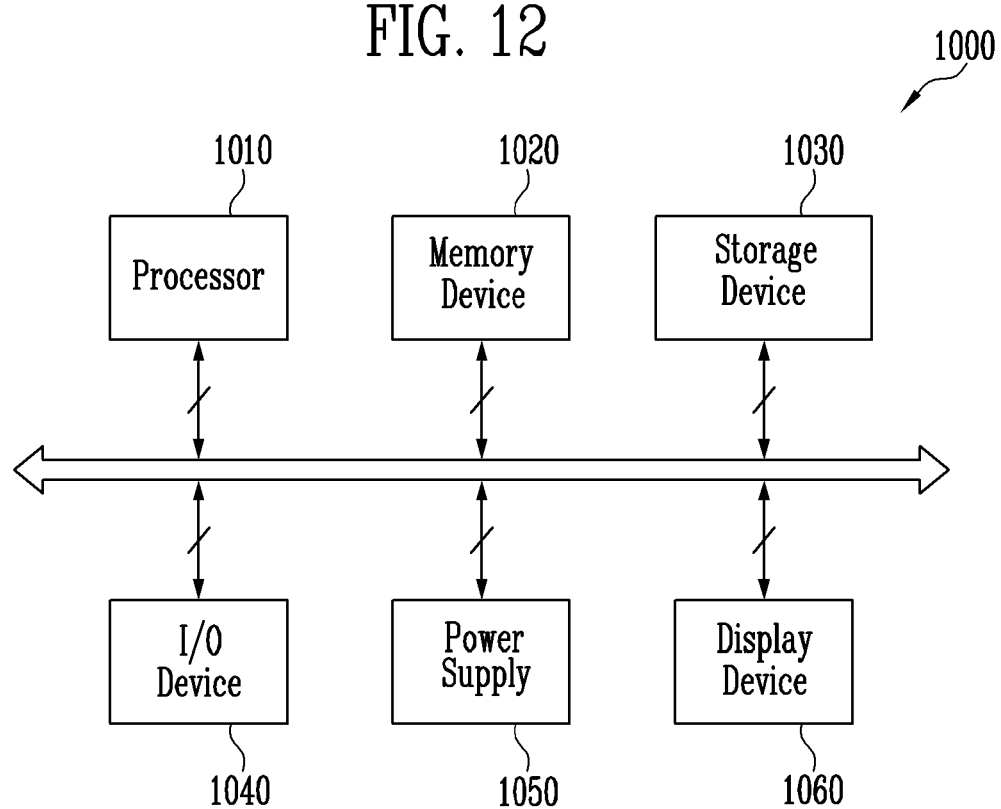
FIG. 12 is a block diagram illustrating an electronic device in accordance with embodiments of the present disclosure.

FIG. 12 is a block diagram illustrating an electronic device in accordance with embodiments of the present disclosure.

Referring to FIG. 12, the electronic device 1000 may include a processor 1010, a memory device 1020, a storage device 1030, an input/output (I/O) device 1040, a power supply 1050, and a display device 1060. The electronic device 1000 may correspond to each of the electronic devices 1000, 1000_1, and 1000_2 described with reference to FIGS. 8 to 10.

The electronic device 1000 may be implemented as various types of devices having a display function, including the display device 1060. The display device 1060 may correspond to each of the display devices 100, 100_1, and 100_2 described in reference to FIGS. 1 to 10.

In an embodiment, the electronic device 1000 may include at least one of a smartphone, a tablet personal computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), an MP3 player, a mobile medical appliance, a camera, and a wearable device (e.g., smart glasses, a Head-Mounted-Device (HMD), electronic clothes, an electronic bracelet, an electronic necklace, an electronic accessory, electronic tattoos, or a smartwatch).

In some embodiments, the electronic device 1000 may be a smart home appliance. The smart home appliance may include at least one of, for example, a TV, a Digital Versatile Disk (DVD) player, an audio device, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

In another embodiment, the electronic device 1000 may include at least one of various medical devices (e.g., various portable medical measuring devices (e.g., a blood sugar measuring device, a heart rate measuring device, a blood pressure measuring device, a body temperature measuring device, etc.), magnetic resonance angiography (MRA) device, magnetic resonance imaging (MRI) device, computed tomography (CT) device, imaging equipment, ultrasonic instrument, etc.)), a navigation device, a global positioning system (GPS) receiver, an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller machine (ATM), a point of sales (POS) terminal, and an Internet of things (IoT) device (e.g., a light bulb, various sensors, an electric or gas meter, a sprinkler device, a fire alarm, a thermostat, a streetlamp, a toaster, fitness equipment, a hot water tank, a heater, a boiler, etc.).

In some embodiments, the electronic device 1000 may include at least one of one part of furniture, buildings/constructions or cars, an electronic board, an electronic signature receiving device, a projector, and various measurement machines (e.g., water supply, electricity, gas, propagation measurement machine, etc.). In various embodiments, the electronic device 1000 may be one of the above-described various devices or a combination of two or more of the above-described various devices. In some embodiments, the electronic devices 1000 may be a flexible electronic device. Also, the electronic device 1000 in accordance with the embodiments of the present disclosure is not limited to the above-described devices, and may include new electronic devices according to technology development.

The processor 1010 may control another component included in the electronic device 1000, and perform various data processing and calculation. In an example, the processor 1010 may supply data corresponding to a predetermined image to the display device 1060. In some embodiments, the processor 1010 may be a microprocessor, a central processing unit, an application processor, or the like. The processor 1010 may correspond to each of the processors 300 and 300_1 described with reference to FIGS. 9 and 10.

The memory device 1020 may store data necessary for an operation of the electronic device 1000. For example, the memory device 1020 may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, or a Ferroelectric Random Access Memory (FRAM) device, and/or a volatile memory device such as a Dynamic Random Access Memory (DRAM) device, a Static Random Access Memory (SRAM) device, or a mobile DRAM device.

The storage device 1030 may include a Solid State Drive (SSD), a Hard Disk Drive (HDD), a CD-ROM, and the like. Software used for the electronic device 1000 may be stored in the storage device 1030. In an example, an operating system, middle ware, an application, and the like may be stored in the storage device 1030.

The input/output device 1040 may receive commands or data, which are used for the electronic device 1000, from outside of the electronic device 1000. To this end, the input/output device 1040 may include a keyboard, a microphone, a mouse, a touch pad, a touch screen, a remote controller, a camera (motion recognition of a user), and the like. Also, the input/output device 1040 may output a sound signal to the outside of the electronic device 1000 by using a speaker or the like.

The power supply 1050 may supply power necessary for an operation of the electronic device 1000.

The display device 1060 visually provides information to a user of the electronic device 1000. Additionally, the display device 1000 may include a touch screen to recognize a touch input from a user.

In accordance with the present disclosure, the display device and the electronic device can determine wireless communication quality, based on a sensing signal corresponding to an external input (e.g., a touch input of a user, or the like). Also, the display device and the electronic device can select an antenna set suitable for a current use environment among antenna sets according to a determination result, and use the selected antenna set in wireless communication. Accordingly, the quality of an antenna transmission/reception signal for wireless communication can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a display panel;
a sensor substrate disposed on the display panel, the sensor substrate including a touch sensing area;
sensing electrodes and antenna sets, disposed on the touch sensing area of the sensor substrate; and
an input sensing circuit configured to sense an external input based on sensing signals from the sensing electrodes,
wherein the input sensing circuit determines whether the external input occurred in an area where the antenna sets are disposed in the touch sensing area, based on the sensing signals,
wherein the sensing electrodes comprise a first sensing electrode extending in a first direction, and the first sensing electrode comprises a first sensing part including an opening and a first connection part, and
wherein the antenna sets comprise a first antenna pattern disposed in the opening of the first sensing part.

2. The display device of claim 1, wherein the input sensing circuit includes a memory configured to store position information of the antenna sets on the touch sensing area, and
wherein the input sensing circuit determines whether the external input occurred in an area where the antenna sets are disposed in the touch sensing area, based on the position information and the sensing signals.

3. An electronic device comprising:
a display panel;
a sensor substrate disposed on the display panel, the sensor substrate including a touch sensing area;
sensing electrodes and antenna sets, disposed on the touch sensing area of the sensor substrate;
an input sensing circuit configured to sense an external input, based on sensing signals provided from the sensing electrodes; and
an antenna module connected to the antenna sets, to perform wireless communication by using a wireless frequency signal transmitted or received to or from at least one of the antenna sets,
wherein the antenna module determines whether the external input occurred in a part of the touch sensing area where the antenna sets are disposed, based on the sensing signals,
wherein the sensing electrodes comprise a first sensing electrode extending in a first direction, and the first sensing electrode comprises a first sensing part including an opening and a first connection part, and
wherein the antenna sets comprise a first antenna pattern disposed in the opening of the first sensing part.

4. The electronic device of claim 3, wherein the antenna module performs wireless communication by using a wireless frequency signal transmitted to or received from a second antenna set disposed in an area different from an area in which a first antenna set is disposed in response to sensing the external input in an area where the first antenna set used for wireless communication is disposed.

5. The electronic device of claim 4, wherein the antenna module performs handover from the first antenna set to the second antenna set.

6. The electronic device of claim 5, wherein the antenna module performs a wireless communication switch from first antenna set to the second antenna set in a soft handover manner.

7. The electronic device of claim 5, wherein the antenna module performs a wireless communication switch from first antenna set to the second antenna set in a hard handover manner.

8. The electronic device of claim 3, wherein wireless communication of the first antenna set is suspended in response to detection of the external input in an area where a first antenna set is disposed.

9. An electronic device comprising:
a display panel;
a sensor substrate disposed on the display panel, the sensor substrate including a touch sensing area;
sensing electrodes and antenna sets, disposed on the touch sensing area of the sensor substrate;
an input sensing circuit configured to sense an external input, based on sensing signals provided from the sensing electrodes; and
an antenna module connected to the antenna sets, to perform wireless communication by using a wireless frequency signal transmitted or received to or from at least one of the antenna sets,
wherein the antenna module determines whether the external input occurred in a part of the touch sensing area where the antenna sets are disposed, based on the sensing signals, wherein the antenna sets include a first antenna set and a second antenna set disposed in an area different from an area in which the first antenna set is disposed, and wherein the antenna module includes:
- a first front end electrically connected to the first antenna set;
- a second front end electrically connected to the second antenna set; and
- a modem configured to process a signal transmitted or received through the first front end and the second front end.

10. The electronic device of claim 9, wherein the input sensing circuit includes a memory configured to store position information of the antenna sets on the touch sensing area, and wherein the input sensing circuit determines whether the external input has occurred on the area in which the antenna sets are disposed in the touch sensing area, based on the position information and the sensing signals, and generates an antenna switching signal including determination result information.

11. The electronic device of claim 10, wherein, when it is determined that the external input occurs on the area in which the first antenna set used for wireless communication among the antenna sets is disposed, based on the antenna switching signal, the antenna module performs a wireless communication switch from the first antenna set to the second antenna set.

12. The electronic device of claim 9, further comprising a processor including a memory configured to store position information of the antenna sets on the touch sensing area, wherein the processor receives the sensing signals from the input sensing circuit, determines whether the external input has occurred on the area in which the antenna sets are disposed in the touch sensing area, based on the position information and the sensing signals, and generates an antenna switching signal including determination result information.

13. The electronic device of claim 12, wherein the antenna module performs a wireless communication switch from the first antenna set to the second antenna set based on the antenna switching signal and a determination that external input occurred in the area where the first antenna set is disposed.

14. The electronic device of claim 12, wherein the antenna switching signal is a command signal.

15. The electronic device of claim 12, wherein the processor controls a notice image for notifying a user of wireless communication to be displayed on at least one partial area in a display area of the display panel in response to a determination that the external input occurred in the area where the antenna sets are disposed in the touch sensing area.

16. The electronic device of claim 15, wherein the at least one partial area corresponds to the area in which the antenna sets are disposed.

17. The electronic device of claim 12, wherein the processor controls a frame frequency of a first display area where the antenna sets are disposed to be different from a frame frequency of a second display area that is in a mutually exclusive area with the first display area in a display area of the display panel, in response to a determination that the external input occurred in the touch sensing area where the antenna sets are disposed.

18. The electronic device of claim 17, wherein the processor controls the frame frequency of the first display area to be lower than the frame frequency of the second display area.

19. The electronic device of claim 12, wherein, the processor controls a brightness of an image displayed in a first display area where the antenna sets are disposed to be different from a brightness of an image displayed in a second display area that is mutually exclusive from the first display area in a display area of the display panel, in response to a determination that the external input occurred on the area in which the antenna sets are disposed in the touch sensing area.

20. The electronic device of claim 19, wherein the processor controls the brightness of an image displayed in the first display area to be lower than the brightness of an image displayed in the second display area.

* * * * *